United States Patent
Sakurai et al.

(10) Patent No.: US 7,145,096 B2
(45) Date of Patent: Dec. 5, 2006

(54) ELECTRIC DISCHARGE MACHINE POWER SUPPLY

(75) Inventors: Akihiro Sakurai, Yamanashi (JP); Yasuo Arakawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/999,949

(22) Filed: Dec. 1, 2004

(65) Prior Publication Data
US 2005/0115929 A1    Jun. 2, 2005

(30) Foreign Application Priority Data
Dec. 1, 2003    (JP)    ............... 2003-402271

(51) Int. Cl.
B23H 1/02    (2006.01)
(52) U.S. Cl. .................................. 219/69.13
(58) Field of Classification Search ............. 219/69.13, 219/69.18
See application file for complete search history.

(56) References Cited

U.S. PATENT DOCUMENTS

| | | | | |
|---|---|---|---|---|
| 3,509,305 A | * | 4/1970 | Bertolasi | 219/69.13 |
| 3,649,802 A | * | 3/1972 | Sennowitz | 219/69.13 |
| 4,892,989 A | * | 1/1990 | Itoh | 219/69.13 |
| 5,352,859 A | * | 10/1994 | Kaneko et al. | 219/69.13 |
| 5,378,866 A | * | 1/1995 | Taneda | 219/69.18 |
| 5,453,593 A | * | 9/1995 | Seok-Yong et al. | 219/69.18 |

FOREIGN PATENT DOCUMENTS

| | | | |
|---|---|---|---|
| JP | 61-111819 A | * | 5/1986 |
| JP | 1-115515 A | * | 5/1989 |
| JP | 07-068418 | | 3/1995 |
| JP | 08-257839 | | 10/1996 |
| JP | 3082253 B2 | * | 8/2000 |

* cited by examiner

Primary Examiner—Geoffrey S. Evans
(74) Attorney, Agent, or Firm—Staas & Halsey LLP

(57) ABSTRACT

An electric discharge machine has a main power supply and a sub-power supply connected in parallel across a gap formed by an electrode and a workpiece. A voltage is first applied to the gap from the sub-power supply, and then machining energy is supplied to the gap from the main power supply when detected that the gap voltage has fallen to or below a certain detection level. Stable machining is achieved by changing the detection level according to the machining state.

6 Claims, 12 Drawing Sheets

(a)

(b)

ELECTRIC DISCHARGE MACHINE POWER SUPPLY

BACKGROUND OF THE INVENTION

1. Field of the Invention

The present invention relates to an electric discharge machine and, more particularly, to an electric discharge machine that detects the start of a discharge across the electrode-workpiece gap and then switches from a sub-power supply to a main power supply.

2. Description of the Related Art

It is known that an electric discharge machine for machining a workpiece by wire-cut electric discharge machining or die-sinking electric discharge machining comprises a main power supply and a sub-power supply. The sub-power supply is used to supply the voltage required for starting a discharge across the gap between the electrode and workpiece. Immediately after the discharge has started, the sub-power supply is switched over to the main power supply. In order to control the timing of the switchover, it is necessary to ascertain just when the discharge has started after the gap voltage has been raised. Known means for ascertaining the point in time at which the discharge starts include observing that the gap voltage has dropped below a predetermined threshold. The threshold is set so that the corresponding observed voltage level is slightly higher than the level observed during the discharge.

In this type of electric discharge machine, the main power supply and sub-power supply are connected in parallel across the gap between the electrode and the workpiece, the sub-power supply always being used first to apply a voltage across the gap, the sub-power supply then being switched over to the main power supply when a gap voltage below the predetermined threshold level is detected.

FIG. 11 illustrates an exemplary electric discharge machining circuit in a conventional electric discharge machine.

The electric discharge machining circuit has a sub-power supply 1 and main power supply 2 that apply voltages across a gap 20 between a wire electrode (hereinafter referred to as a wire 5) and a workpiece 6, and a detection circuit 30 that detects the voltage across the gap 20.

The sub-power supply 1 applies a voltage for discriminating discharge initiation and more generally the status of the gap 20, while the main power supply 2 supplies the energy for actual machining; voltages are applied in response to the status of the gap 20, e.g., to whether a discharge has started. The detection circuit 30 detects the voltage across the gap 20 to determine the time at which to supply energy from the main power supply 2 after a voltage has been applied by the sub-power supply 1.

The control circuit 10 closes a sub-power supply switching device 3 to apply a voltage from the sub-power supply 1 to the gap 20, and then closes a main power supply switching device 4 in response to a detection signal from the detection circuit 30 to apply a voltage from the main power supply 2 to the gap 20.

In practice, the detection circuit 30 is usually connected to a workpiece mount (hereinafter referred to as a table 19) that secures the workpiece 6 and to a conductor 18 that supplies electricity to the wire 5. The measured voltage is a divided voltage (hereinafter referred to as the detected voltage), being divided by the internal impedance of the sub-power supply 1 and the series impedance of the gap 20, conductor 18, wire 5, workpiece 6 and table 19.

Even when the gap 20 is the same, therefore, the detected voltage varies with the impedance of the workpiece 6.

Energy is supplied from the main power supply upon detecting the voltage drop caused by the discharge across the gap after voltage is applied by the sub-power supply. The voltage drop across the gap is detected by comparing the detected voltage with a predetermined voltage level (hereinafter referred to as the detection level).

Accordingly, if the same detection level is used for machining a workpiece having different impedance, power will be supplied from the main power supply for a workpiece having low impedance, while power will not be supplied from the main power supply for a workpiece having high impedance, thereby making the machining process unstable. Because the gap voltage cannot be detected correctly, the machining speed becomes unstable; in the worst case, machining becomes impossible.

The appropriate detection level varies with the wire diameter, workpiece material, and other parameters; past practice has been to determine the appropriate detection level by preliminary test machining, and to leave the level unchanged during the subsequent machining process.

Techniques for varying the detection level responsive to the sub-power supply voltage or the machining conditions are disclosed in, for example, Japanese Patent Applications Laid-open Nos. H08-257839 and H07-68418; in these patent documents, however, the detection level is set in advance and is not changed according to the machining state during the machining process.

The detection circuit detects a voltage divided by the internal impedance of the sub-power supply 1 and the series impedance of the gap 20, conductor 18, wire 5, workpiece 6, and table 1. The divided voltage may change during machining according to, for example, the state of the contact between the conductor 18 and wire 5, the impedance of the wire or workpiece, and the internal state of the sub-power supply circuit; when this happens, the time at which power is supplied from the main power supply may be delayed or advanced, making the machining process unstable.

FIG. 12 plots the relation between the detected gap voltage and the width of the gap for a workpiece having high impedance and a workpiece having low impedance. A comparison of these two cases shows that the actual size of the gap differs even if the detected voltages are the same, while the detected voltage differs if the size of the gap is the same. Therefore, the detection level needs to be changed according to the impedance of the workpiece in order to maintain the same gap.

FIG. 13 illustrates exemplary operating waveforms in the conventional art, indicating that the main power pulse frequency differs according to the impedance of the workpiece. In FIG. 13, DL is the detection level, Vgd is the gap voltage detected by the detection circuit 30, S1 and S2 are the operation signals of the sub-power and main power supply switching devices 3 and 4, respectively, C1 is the output signal from the detection circuit 30, and the C2 pulses indicate rising edges of the C1 signal. The number of C2 pulses equals the number of main power pulses, that is, the number of times the main power supply supplies power.

Comparing the number of times the main power supply supplies power during a fixed period Ts in case where the detection level DL is fixed as in the conventional art, the number of C2 pulses increases when the impedance of the workpiece is low and decreases when the impedance is high. This means that the main power pulse frequency increases when the impedance of the workpiece is low and decreases when the impedance is high. Since the main power pulse frequency varies according to the impedance of the workpiece, the machining process becomes unstable.

FIG. 14 shows other exemplary operating waveforms in the conventional art, indicating that the time interval from when a voltage is applied by the sub-power supply until power is supplied from the main power supply varies according to the impedance of the workpiece. In FIG. 14, DL and Vgd are again the detection level and the gap voltage detected by the detection circuit 30. Td1, Td2, and Td3 are time intervals from when voltage is applied by the sub-power supply until power is supplied from the main power supply, for a reference impedance, low impedance, and high impedance, respectively.

Comparing the time interval from when voltage is applied by the sub-power supply until power is supplied from the main power supply in the case where the detection level DL is fixed as in the conventional art, the time interval Td2 for low workpiece impedance is shorter than the time interval Td1 for the reference impedance, and the time interval Td3 for high workpiece impedance is longer than the time interval Td1 for the reference impedance.

Therefore, the time interval from when voltage is applied by the sub-power supply until power is supplied from the main power supply changes according to the impedance of the workpiece, thereby preventing stable machining.

The amount of energy supplied from the main power supply during one discharge is substantially constant, so the total machining energy depends on the number of main power pulses. If, as in the conventional art, a change in impedance leads to changes in the main power pulse frequency or the time interval Td from when voltage is applied by the sub-power supply until power is supplied from the main power supply, the total energy supplied to the workpiece also changes, thereby preventing stable machining.

SUMMARY OF THE INVENTION

The present invention provides an electric discharge machine that performs stable electric discharge machining regardless of change in impedance of a workpiece.

Comparing a workpiece with high impedance with a workpiece with low impedance, the same voltage may be detected at gaps having different sizes, whilst different voltage may be detected at the same gap. To keep constant a gap formed by an electrode and a workpiece, therefore, the detection level needs to be changed according to the impedance of the workpiece. In electric discharge machining, the machining state varies according to the workpiece impedance.

In the case of the present invention, the detection level is changed according to the machining state during machining so that stable electric discharge machining is achieved regardless of change in impedance of a workpiece.

An electric discharge machine according to the present invention has a main power supply and sub-power supply connected in parallel across a gap formed by an electrode and workpiece. In such an electric discharge machine, voltage is applied first from the sub-power supply to the gap, and then machining energy is supplied from the main power supply to the gap when detected that the gap voltage has fallen to or below a certain detection level; thereby changing the detection level during machining according to the machining state. Changing the detection level according to the machining state enables stable machining.

The amount of energy supplied from the main power supply during one discharge pulse is substantially constant, so the total machining energy depends on how frequently the main power supply is pulsed on. The present invention assures stable machining regardless of the value of the workpiece impedance, by maintaining a constant machining energy and a feed rate (machining speed) suitable for the supplied energy.

In a first embodiment of the present invention, the index of the machining state that varies with the workpiece impedance is the number of main power pulses per unit distance; the detection level is changed so that the number of main power pulses approaches a certain reference value; the number of main power pulses per unit distance is thereby kept constant, thereby achieving stable electric discharge machining regardless of change in impedance of a workpiece.

In a second embodiment of the present invention, the index of the machining state that varies with the workpiece impedance is the time interval from when voltage is applied by the sub-power supply until power is supplied from the main power supply; the detection level is changed so that the time interval approaches a certain reference value, thereby achieving stable electric discharge machining regardless of change in impedance of a workpiece.

The electric discharge machine according to the present invention comprises a main power supply and sub-power supply connected in parallel across a gap formed by an electrode and workpiece, detecting means for detecting the gap voltage across the gap and comparing the gap voltage with a detection level, control means for controlling the timing at which voltages are applied to the gap from the main power supply and sub-power supply and switching the voltage source from the sub-power supply to the main power supply when the gap voltage falls to or below the detection level according to the detection result from the detecting means, machining state detecting means for detecting a machining state of the electric discharge machine during machining according to the comparison result from the detecting means, and detection level changing means for changing the detection level used by the detecting means according to the machining state detected by the machining state detecting means.

When the number of main power pulses per unit distance is kept constant to achieve stable machining regardless of change in impedance of a workpiece, the machining state detecting means counts the number of main power pulses per unit distance according to the comparison result from the detecting means. The detection level changing means changes the detection level so as to reduce the difference between the number of main power pulses, as detected by the machining state detecting means, and a certain reference number to zero.

When the time interval from when voltage is applied by the sub-power supply until power is supplied from the main power supply is kept constant to achieve stable electric discharge machining regardless of change in impedance of a workpiece, the machining state detecting means measures the time elapsed after a voltage has been applied by the sub-power supply until power is supplied from the main power supply, according to the comparison result from the detecting means. The detection level changing means changes the detection level so as to reduce the difference between the elapsed time measured by the machining state detecting means and a certain reference time to zero.

The electric discharge machine according to the present invention enables stable electric discharge machining regardless of change in impedance of a workpiece.

The electric discharge machine according to the present invention keeps the number of main power pulses per unit distance constant to achieve stable electric discharge machining regardless of change in impedance of a workpiece.

The electric discharge machine according to the present invention keeps constant the time interval from when voltage is applied by the sub-power supply until power is supplied from the main power supply to achieve stable electric discharge machining regardless of change in impedance of a workpiece.

BRIEF DESCRIPTION OF THE DRAWINGS

The purposes and advantages of the present invention, including those described above, will be clarified with reference to the attached drawings in combination with the description of the embodiments presented below. Of these drawings.

DESCRIPTION OF THE EMBODIMENTS

Figure 1:
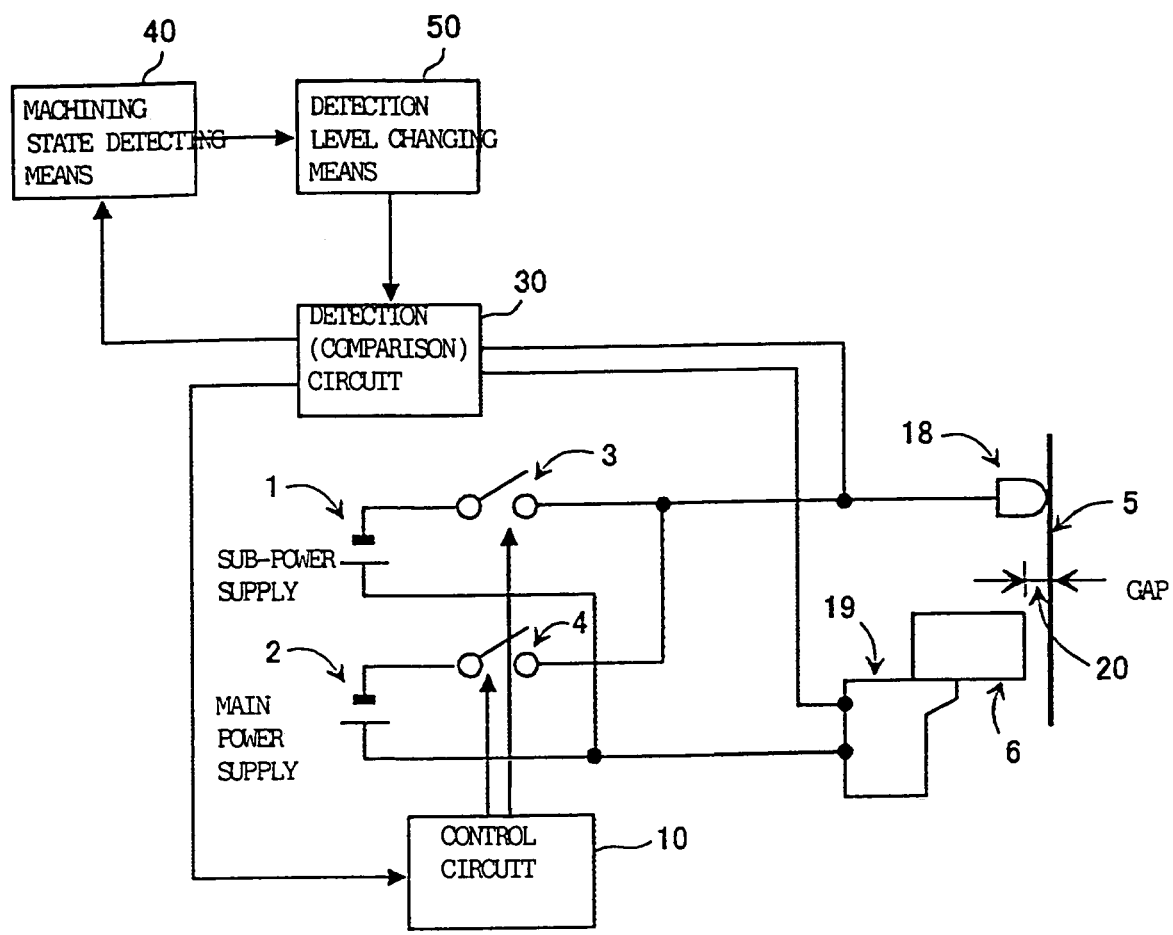
FIG. 1 is a schematic view illustrating an example of an electric discharge machine according to the present invention.

An electric discharge machine according to the present invention will be described below using examples, with reference to the drawings. FIG. 1 is a schematic view illustrating an example of an electric discharge machining circuit in the electric discharge machine according to the present invention.

The electric discharge machining circuit has a sub-power supply 1 and main power supply 2 that apply voltages across a gap 20 between a wire electrode (a wire 5) and a workpiece 6, and a detection circuit 30 that detects the voltage across the gap 20.

The sub-power supply 1 applies a voltage for determining the state of the gap 20, e.g., the start of the discharge. The main power supply 2 supplies energy for actual machining, and voltage is applied in according to the status of the gap, e.g., a discharge has started. The detection circuit 30 detects the voltage across the gap 20 to detect the time at which to supply energy from the main power supply 2 after a voltage has been applied by the sub-power supply 1.

The control circuit 10 closes a sub-power supply switching device 3 to apply a voltage from the sub-power supply 1 to the gap 20, and then closes a main power supply switching device 4 in response to a detection signal from the detection circuit 30 to apply a voltage from the main power supply 2 to the gap 20.

The detection circuit 30 is connected to a workpiece mount (a table 19) that secures the workpiece 6 and to a conductor 18 that supplies power to the wire 5, and detects the gap voltage Vg across the gap 20 as a divided voltage (detected voltage) Vgd, divided by the internal impedance of the sub-power supply 1 and the series impedance of the gap 20, conductor 18, wire 5, workpiece 6 and table 19.

By comparing the detected voltage Vgd with the detection level DL, the detection circuit 30 determines when a discharge has begun.

The electric discharge machine according to the present invention has a detection level changing means 50 that changes the detection level which is to be compared with the gap voltage in the detection circuit 30 according to the output from the machining state detecting means 40.

Figure 2:
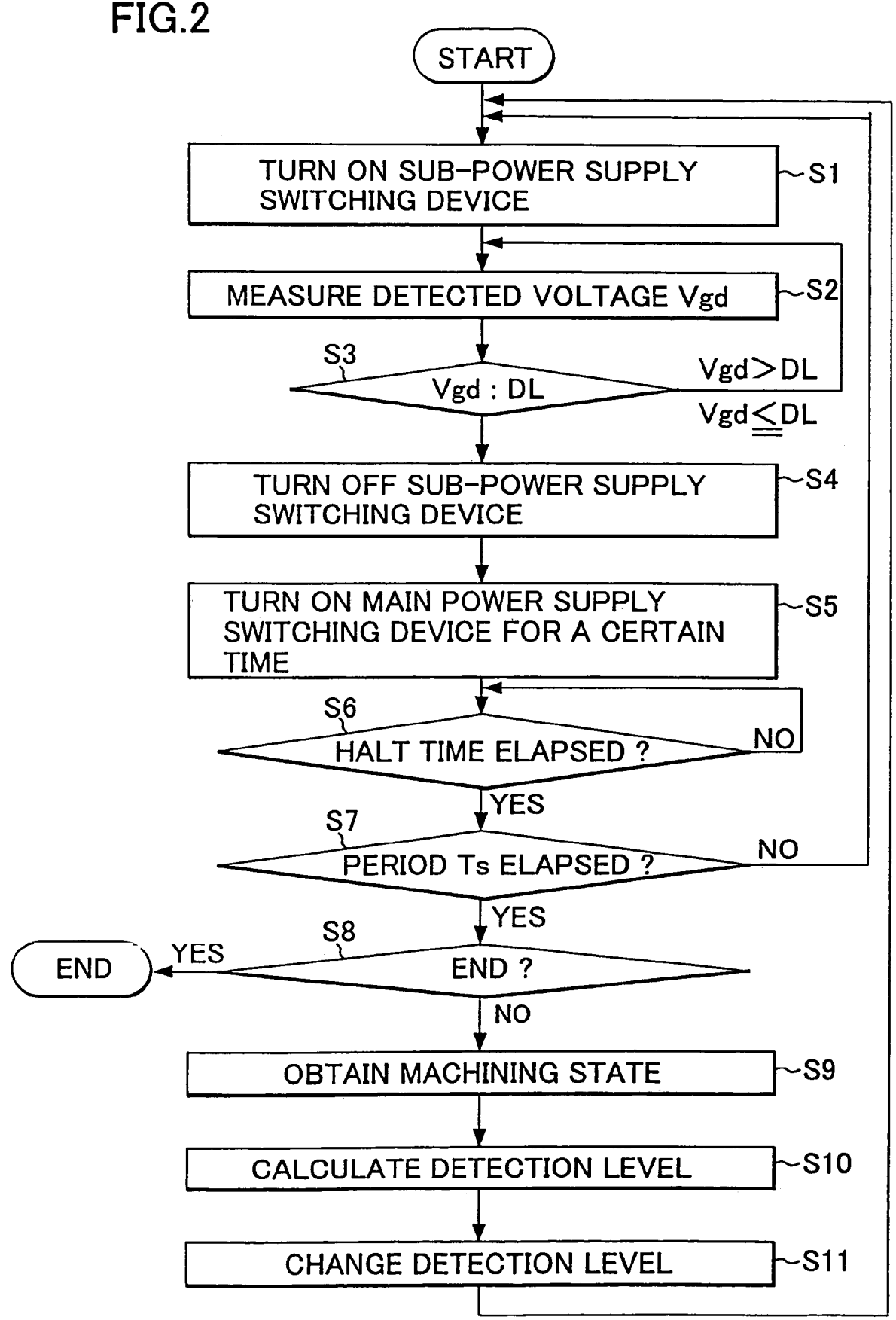
FIG. 2 is a flowchart illustrating an exemplary operation of the electric discharge machine shown in FIG. 1.

An exemplary operation of the electric discharge machine according to the present invention will be described with reference to the flowchart shown in FIG. 2.

First, the control circuit 10 closes (turns on) the sub-power supply switching device 3 to apply a voltage from the sub-power supply 1 to the gap 20 (step S1). The detection circuit 30 measures the voltage Vg across the gap 20 by detecting the voltage Vgd obtained from voltage division by the internal impedance of the sub-power supply 1 and the series impedance of the gap 20, conductor 18, wire 5, workpiece 6 and table 19 (step S2).

When a discharge starts in the gap 20, the gap voltage Vg drops. The detection circuit 30 detects the change in the gap voltage Vg across the gap 20 as a change in the detected voltage Vgd, and determines whether the detected voltage Vgd has fallen to or below the detection level DL (step S3).

When the detected voltage Vgd falls to or below the detection level DL, the sub-power supply switching device 3 opens (is turned off) to stop the sub-power supply 1 from applying voltage across the gap 20 (step S4), and the main power supply switching device 4 closes (is turned on) to apply a voltage from the main power supply 2 to the gap 20 for a certain period of time, during which machining is performed (step S5).

When a certain period of halt time has elapsed after the main power supply switching device 4 has been opened (turned off) (step S6), the above processes from step S1 to step S6 are repeated for a certain period of time Ts (step S7). While repeating processes from step S1 to step S7, the electric discharge machine moves the electrode (wire 5) with respect to the workpiece 6 to machine the workpiece (step S8).

While electric discharge machining is in progress, the electric discharge machine according to the present invention changes the detection level by the process from step S9 to step S11 described below so that stable electric discharge machining can be performed even when the impedance of the workpiece is changed.

To change the detection level, the machining state detecting means 40 determines the machining state during electric discharge machining according to an output obtained from the detection circuit 30 (step S9), the detection level changing means 50 determines a new detection level DL corresponding to the machining state obtained by the machining state detecting means 40 (step S10), and the old detection level is replaced with the new detection level (step S11).

After the detection level has been changed, the processes in step S1 to step S7 are repeated for the time period Ts and then the detection level is changed again. The workpiece is machined by repeating the above operation while the electrode (wire 5) is moved with respect to the workpiece 6.

Figure 3A:
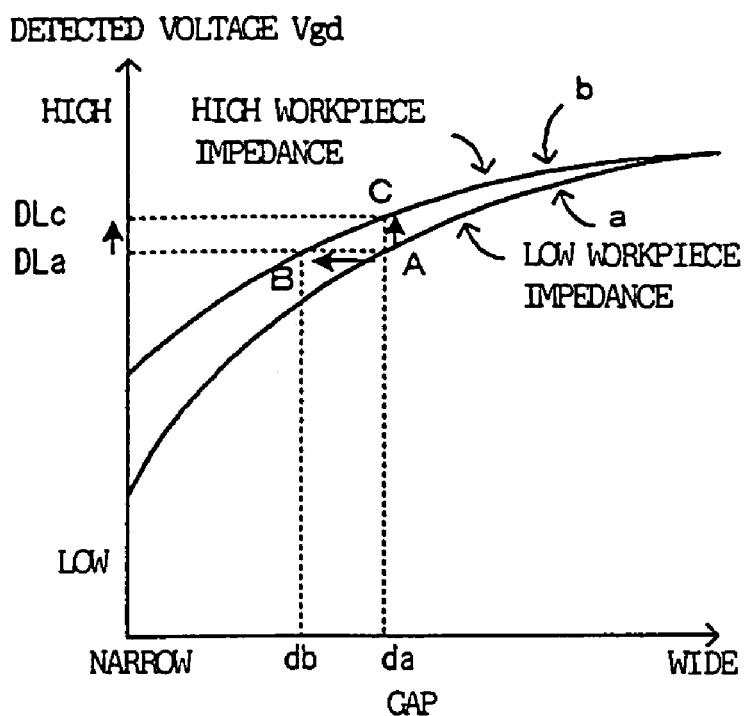
FIGS. 3A and 3B illustrate how the detection level changes according to the machining state.
Figure 3B:
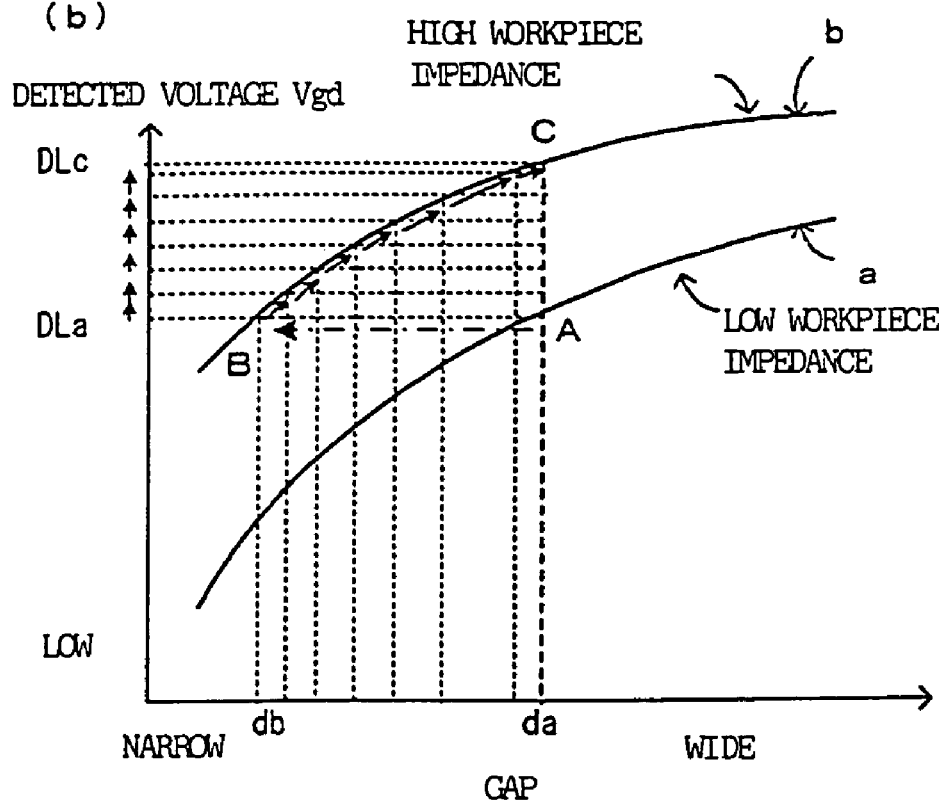
Figure 4A:
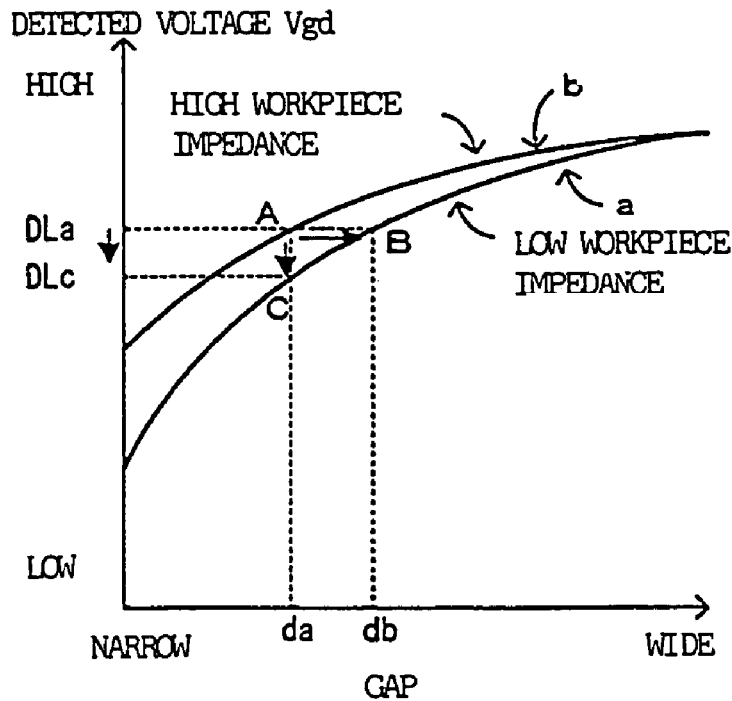
FIGS. 4A and 4B illustrate how the detection level changes according to the machining state.
Figure 4B:
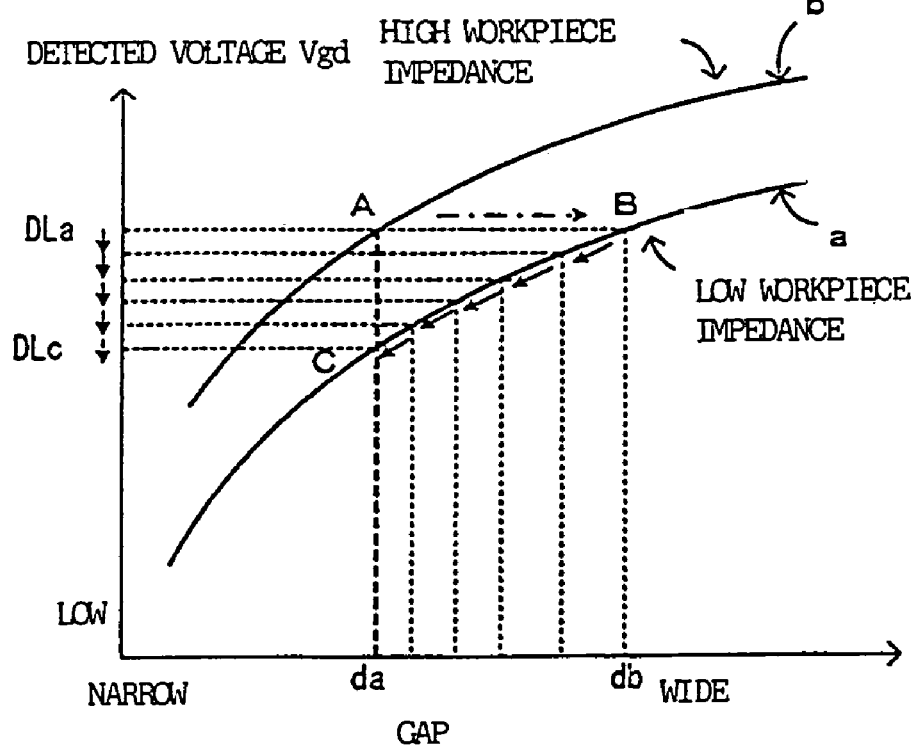

How the detection level DL is changed according to the machining state will be described below with reference to FIGS. 3A, 3B, 4A and 4B. FIGS. 3A and 3B illustrate a change in the detection level when the impedance of a workpiece changes from lower impedance to higher-impedance. FIGS. 4A and 4B illustrate a change in the detection level when the impedance of a workpiece changes from lower impedance to higher impedance.

The lower curve a shown in FIG. 3A schematically indicates the relationship between the gap d and detected voltage (Vgd) for the low-impedance area of workpiece; the upper curve b schematically indicates the relationship between the gap d and detected y voltage (Vgd) for the high-impedance area of workpiece.

When the low-impedance area of workpiece is machined with, for example, point A (on curve a) as the operating point, power is supplied from the main power supply when the detected voltage Vgd falls to level DLa. The gap at that time is da.

When the impedance of a workpiece changes from low impedance to high impedance, the relationship between the gap width and the detected voltage follows curve b, so if the start of the discharge were to be detected using the same detection level DLa, machining would proceed using point B on curve b as the operating point. The gap would then be db, deviating from the initial gap da.

The electric discharge machine according to the present invention, however, changes the detection level DL when the impedance of a workpiece changes from low impedance to high impedance, and uses point C on curve b as the operating point, thereby maintaining the initial gap da.

FIG. 3B shows how the operating point on curve b for the high-impedance area of workpiece is changed from B to C by gradually changing the detection level from DLa to DLc.

In FIG. 4A, the upper curve a schematically indicates the relationship between the gap d and detected voltage (Vgd) for the low-impedance area of workpiece, and the upper curve b schematically indicates the relationship between the-gap d and detected voltage (Vgd) for the n area of workpiece.

When the high-impedance area of workpiece is machined with, for example, point A (on curve b) as the operating point, power is supplied from the main power supply when the detected voltage Vgd falls to level DLa. The gap at that time is da.

When the impedance of a workpiece changes from high impedance to low impedance, the relationship between the gap width and detected voltage follows curve a, so if the start of the discharge were to be detected using the same detection level DLa, machining would proceed using point B on curve a as the operating point. The gap would then become db, deviating from the initial gap da.

The electric discharge machine according to the present invention, however, changes the detection level DL from DLa to DLc when the impedance of a workpiece changes from high impedance to low impedance, and uses point C on curve a as the operating point, thereby maintaining the initial gap da.

FIG. 4B shows how the operating point on curve a for the low-impedance area of workpiece is changed from B to C by gradually changing the detection level DL.

Next, a first embodiment of the electric discharge machine according to the present invention in which the detection level is changed according to the machining state will be described. In the first embodiment, the machining state is detected according to the number of main power pulses per unit distance, and that number is kept constant to achieve stable electric discharge machining regardless of change in impedance of a workpiece.

Stable machining regardless of the value of the workpiece impedance requires maintaining a constant machining energy and a feed rate (machining speed) suitable for the supplied energy.

The amount of energy supplied by the main power supply in one discharge pulse is substantially constant, so the total amount of energy supplied for machining depends on the number of main power pulses. Therefore, stable machining is possible by holding the number of main power pulses per unit distance to a constant value.

If the number of main power pulses per unit distance is kept constant by changing the detection level, the changed detection level may be regarded as appropriate. When the machining speed is constant, the detection level is changed so that the number of main power pulses per unit time becomes constant.

Figure 5:
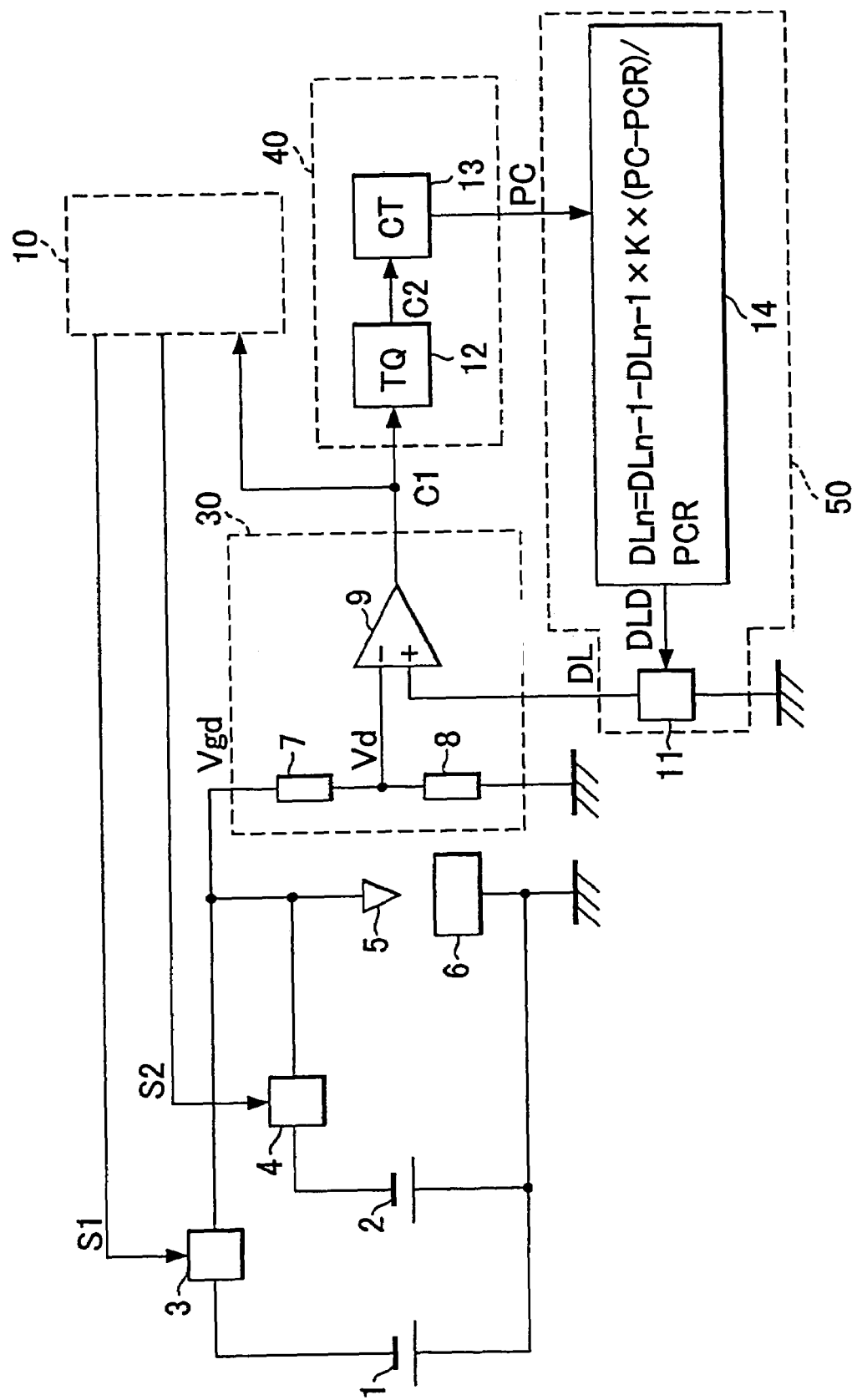
FIG. 5 is a schematic circuit diagram implementing a first example of the electric discharge machine shown in FIG. 1.

FIG. 5 shows an exemplary structure of the first embodiment. The dividing resistors 7 and 8 and the comparator 9 shown in FIG. 5 constitute the detection circuit 30 shown in FIG. 1. In the actual circuit, the detected voltage Vgd is divided by the dividing resistors 7 and 8. The detection level DL is set according to the value to which the detected voltage is divided by the dividing resistors 7 and 8 when power is supplied from the main power supply. The comparator 9 compares the voltage Vd, obtained by dividing the detected voltage Vgd by the dividing resistors 7 and 8 with the detection level DL, and outputs signal C1.

The monostable multivibrator 12 and counter 13 shown in FIG. 5, which constitute the machining state detecting means 40 shown in FIG. 1, count the number of C1 outputs from the comparator 9. This count represents the number of times PC the main power supply 2 supplies power.

The arithmetic circuit 14 and D/A converter 11 shown in FIG. 5 constitute the detection level changing means 50 shown in FIG. 1. The arithmetic circuit 14 calculates a detection level DLn which would cause the value of PC to be kept constant, from the main power pulse count PC per unit time. The D/A converter 11 converts the output from the arithmetic circuit 14 to an analog signal, which becomes the reference value of the comparator 9. The reference value is used as a reference voltage to detect events such as the occurrence of a discharge, and is changed during machining when updated by the arithmetic circuit 14.

In the structure shown in FIG. 5, the discharging circuit which comprises the main power supply and sub-power supply first uses signal S1 from the control circuit 10 to bring the sub-power supply switching device 3 into the conductive state (ON state) so that a voltage is applied across the gap.

The detected voltage Vgd is divided by the dividing resistors 7 and 8, and the divided voltage Vd is compared with the detection level DL by the comparator 9. When the divided voltage Vd falls to or below the detection level DL due to a discharge, the control circuit 10 brings the sub-power supply switching device 3 into the non-conductive state (OFF state) and brings the main power supply switching device 4 into the conductive state (ON state) for a certain period of time to supply energy for machining.

After the energy has been supplied, the control circuit 10 provides a certain halt period to restore electrical isolation across the gap, then turns on the sub-power supply switching device 3 again to apply a voltage across the gap, and repeats the above sequence of operations.

Figure 6:
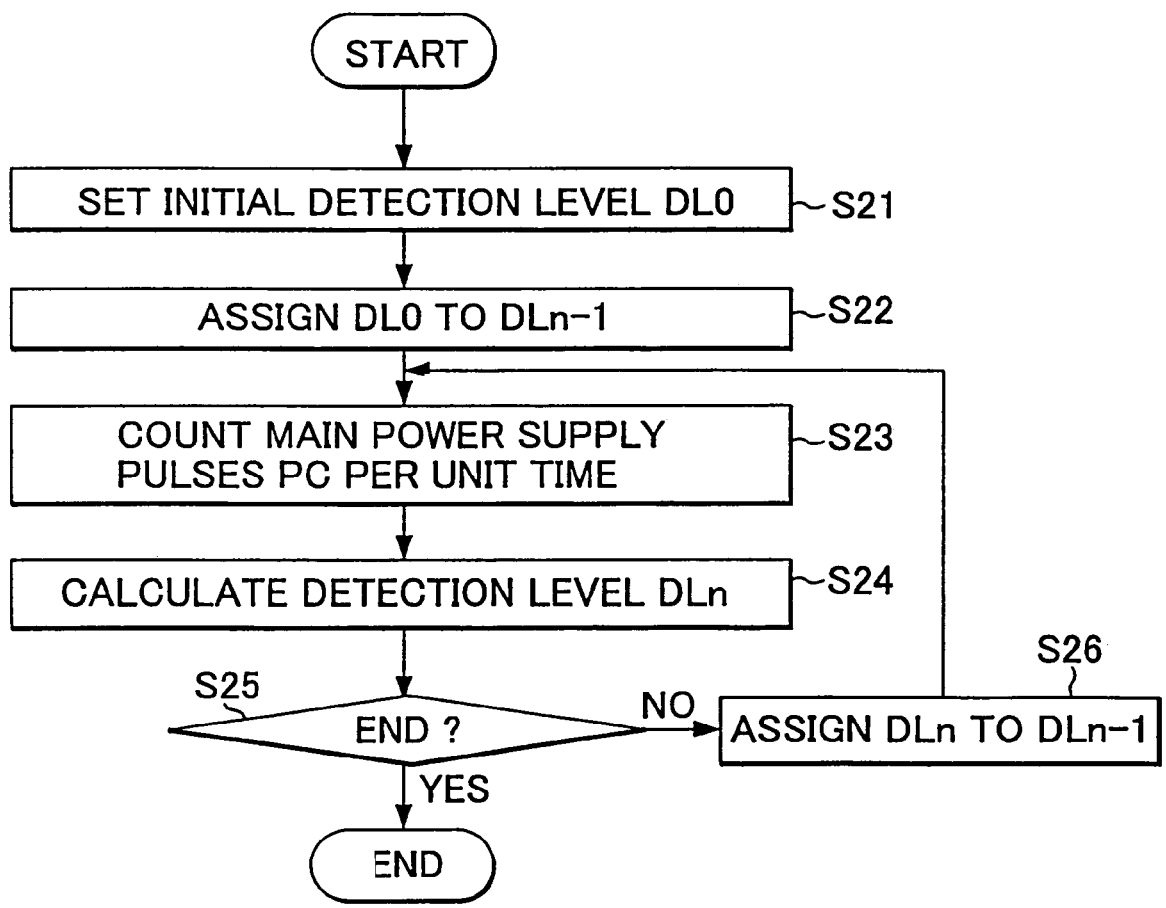
FIG. 6 is a flowchart illustrating how a detection level is calculated for the electric discharge machine shown in FIG. 5.

FIG. 6 is a flowchart illustrating how the detection level is calculated when the detection level is changed according to the number of main power pulses per unit time.

The detection level is initially set to DL0 (step S21), and the initial detection level DL0 is assigned as detection level DLn−1 (step S22).

The divided voltage Vd is compared with detection level DLn−1; if Vd is equal to or below DLn−1, the output C1 from the comparator 9 changes from the low level to the high level. The monostable multivibrator 12 captures the rising edge of the C1 signal and generates a pulse output C2 with a certain width. The counter 13 counts the C2 pulses and sends the pulse count PC to the arithmetic circuit 14 every certain period of time Ts, whereby the main power pulse count PC is calculated (step S23).

The arithmetic circuit 14 calculates the next detection level DLn from equation (1) (step S24), outputs a digital signal DLD corresponding to the calculated value, and sets the above detection level DLn (steps S25 and S26).

$$DLn=(DLn-1)-(DLn-1)*K*(PC-PCR)/PCR \qquad (1)$$

where:
PC: Number of main power pulses per unit time
PCR: Reference number of main power pulses per unit time
K: Coefficient
DLn, DLn−1: Detection levels The D/A converter 11 converts the digital signal DLD to an analog detection level signal DL and outputs it.

Figure 7:
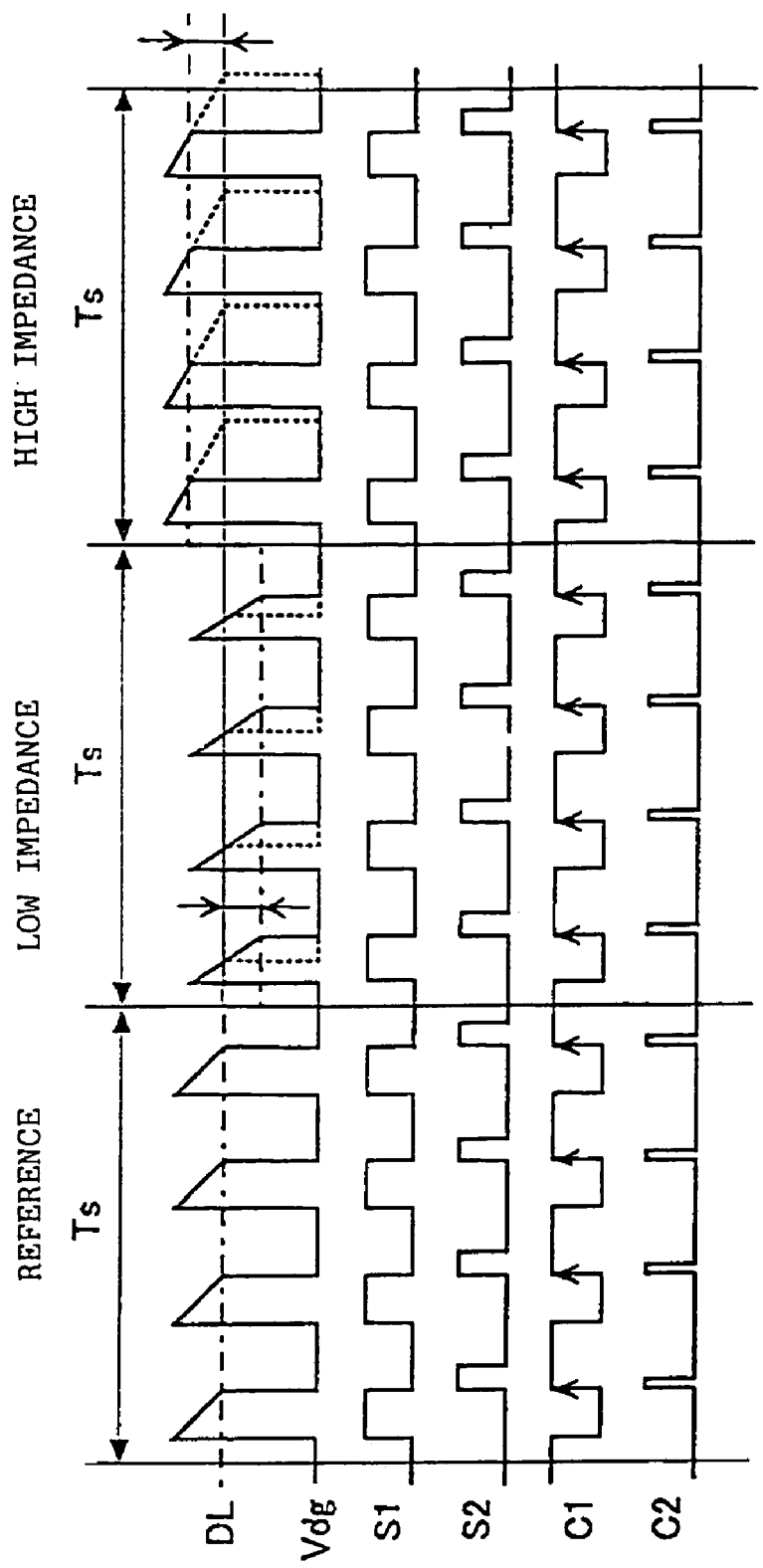
FIG. 7 shows exemplary operating waveforms during machining by the electric discharge machine shown in FIG. 5.

FIG. 7 shows exemplary operating waveforms in the first embodiment.

According to equation (1), when the main power pulse count PC is greater than the reference value PCR, control is performed to lower the detection level DL, thereby decreasing the value of PC until PC finally becomes equal to PCR.

When the main power pulse count PC is smaller than the reference value PCR, on the other hand, control is performed so as to raise the detection level DL, thereby increasing the value of PC until PC likewise becomes equal to PCR. Thus, the main power pulse count is held at the reference value, achieving stable machining.

Next, a second embodiment of the electric discharge machine according to the present invention in which the detection level is changed according to the machining state will be described. In the second embodiment, the machining state depending on the workpiece impedance is detected based on the time interval from when voltage is applied by the sub-power supply until power is supplied from-the main power supply, and the detection level is changed in such a way that the time interval approaches a certain reference value, achieving stable electric discharge machining regardless of change in impedance of a workpiece.

The amount of energy supplied from the main power supply in one discharge pulse is substantially constant, so the amount of machining performed on a workpiece by using that energy is also substantially constant. If the time interval from when voltage is applied by the sub-power supply until power is supplied from the main power supply is constant for a certain feed rate, therefore, the gap can be regarded as constant.

The machining speed can be made constant by changing the detection level in such a way that the time interval from when voltage is applied by the sub-power supply until power is supplied from the main power supply becomes constant.

Figure 8:
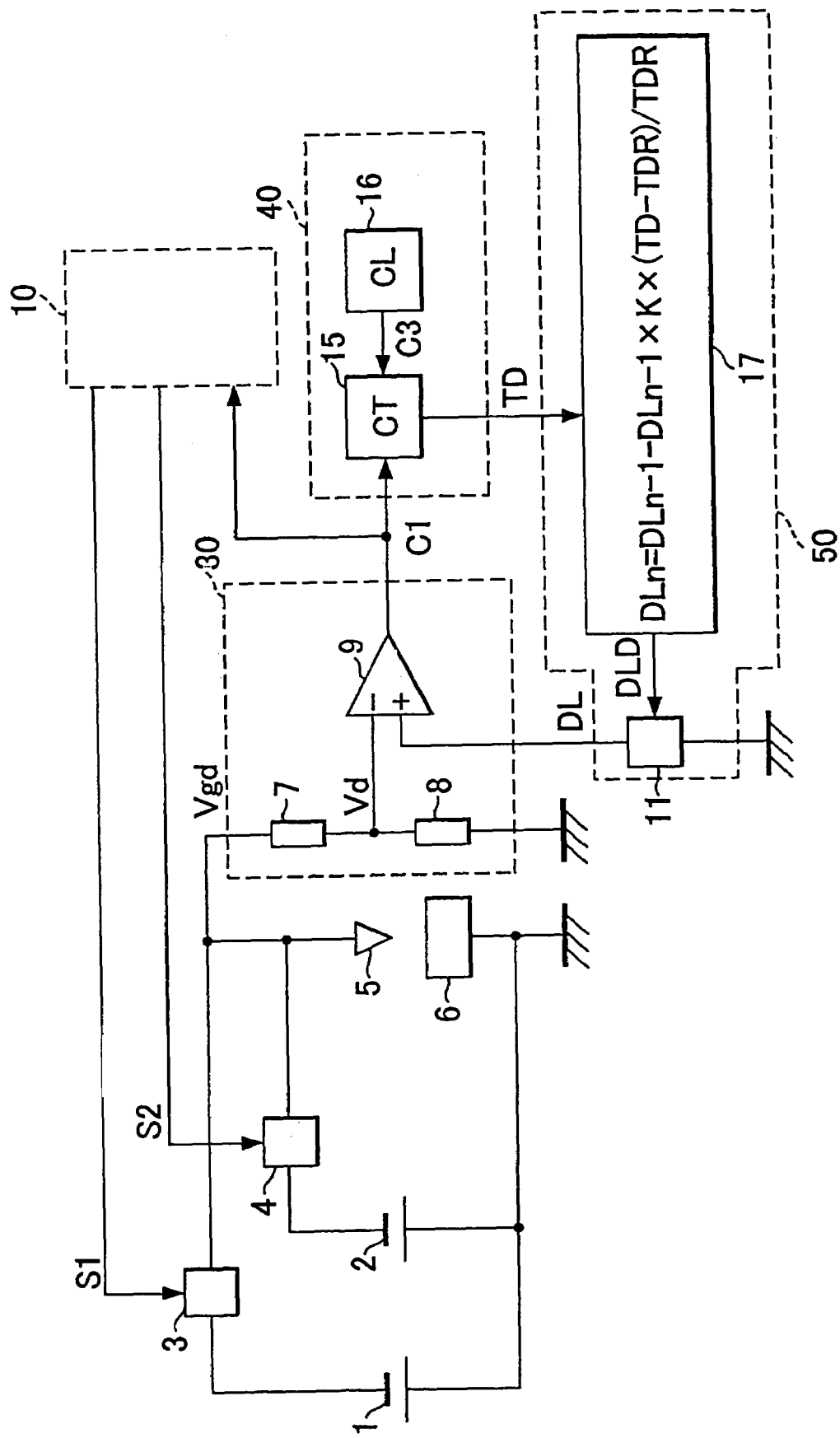
FIG. 8 is a schematic circuit diagram implementing a second example of the electric discharge machine shown in FIG. 1.

FIG. 8 shows an exemplary structure of the second embodiment. The dividing resistors 7 and 8 and the comparator 9 shown in FIG. 8 constitute the detection circuit 30 shown in FIG. 1. The detected voltage Vgd is divided by the dividing resistors 7 and 8. The detection level DL is set to a value obtained by dividing the detected voltage by the dividing resistors 7 and 8 when power is supplied from the main power supply. The comparator 9 compares the voltage Vd, obtained by dividing the detected voltage Vgd by the dividing resistors 7 and 8 with the detection level DL, and outputs signal C1.

The counter 15 and clock circuit 16 shown in FIG. 8, which constitute the machining state detecting means 40 shown in FIG. 1, measure the time interval TD from when voltage is applied by the sub-power supply until power is supplied from the main power supply, according to output C1 from the comparator 9.

The arithmetic circuit 17 and D/A converter 11 shown in FIG. 8 constitute the detection level changing means 50 shown in FIG. 1. The arithmetic circuit 17 calculates a detection level DLn which causes time interval to be kept constant, from the time interval TD up to the point at which power is supplied from the main power supply. The D/A converter 11 converts the output from the arithmetic circuit 17 to an analog signal, which becomes the reference value of the comparator 9. The reference value is used as a reference voltage to detect events such as the occurrence of a discharge, and is changed during machining when updated by the arithmetic circuit 17.

In the structure shown in FIG. 8, the discharging circuit which comprises the main power supply and sub-power supply first uses signal S1 from the control circuit 10 to bring the sub-power supply switching device 3 into the conductive state (ON state) so that a voltage is applied across the gap.

The detected voltage Vgd is divided by the dividing resistors 7 and 8, and the divided voltage Vd is compared with the detection level DL by the comparator 9. When the divided voltage Vd falls to or below the detection level DL due to a discharge, the control circuit 10 brings the sub-power supply switching device 3 into the non-conductive state (OFF state) and brings the main power supply switching device 4 into the conductive state (ON state) for a certain period of time to supply energy for machining.

After the energy has been supplied, the control circuit 10 provides a certain halt period to restore the electrical isolation across the gap, then turns on the sub-power supply switching device 3 again to apply a voltage across the gap, and repeats the above sequence of operations.

Figure 9:
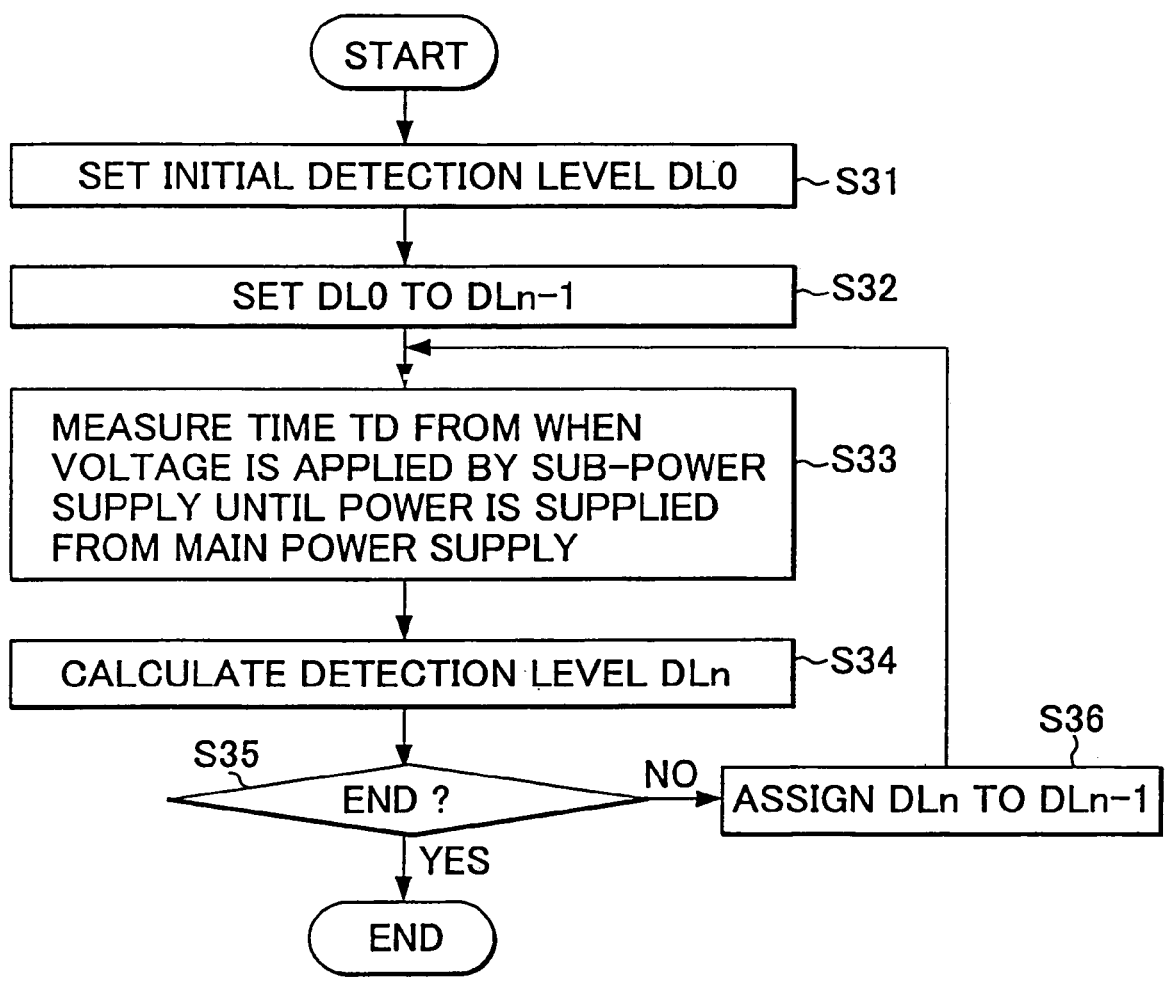
FIG. 9 is a flowchart for calculating a detection level for the electric discharge machine shown in FIG. 8.

FIG. 9 is a flowchart for illustrating how the detection level is calculated when the detection level is changed according to the time interval from when a voltage is applied by the sub-power supply until power is supplied from the main power supply.

The detection level is initially set to DL0 (step S31), and the initial detection level DL0 is set as detection level DLn−1 (step S32).

The clock circuit 16 measures the time interval during which the divided voltage Vd is above the detection level DL, starting when a voltage is applied across the gap by the sub-power supply 1. The output C3 from the clock circuit 16 becomes high level and low level alternately at fixed intervals.

The counter 15 counts the number of clock circuit outputs C3 while the divided voltage Vd is above the detection level DL (step S33). This period corresponds to the period during which the output C1 from the comparator 9 is high. The output TD from the counter 15 is sent to the arithmetic circuit 17.

The output TD from the counter 15 multiplied by the clock circuit output period is the time from when a voltage is applied across the gap by the sub-power supply 1 until power is supplied from the main power supply 2.

Figure 10:
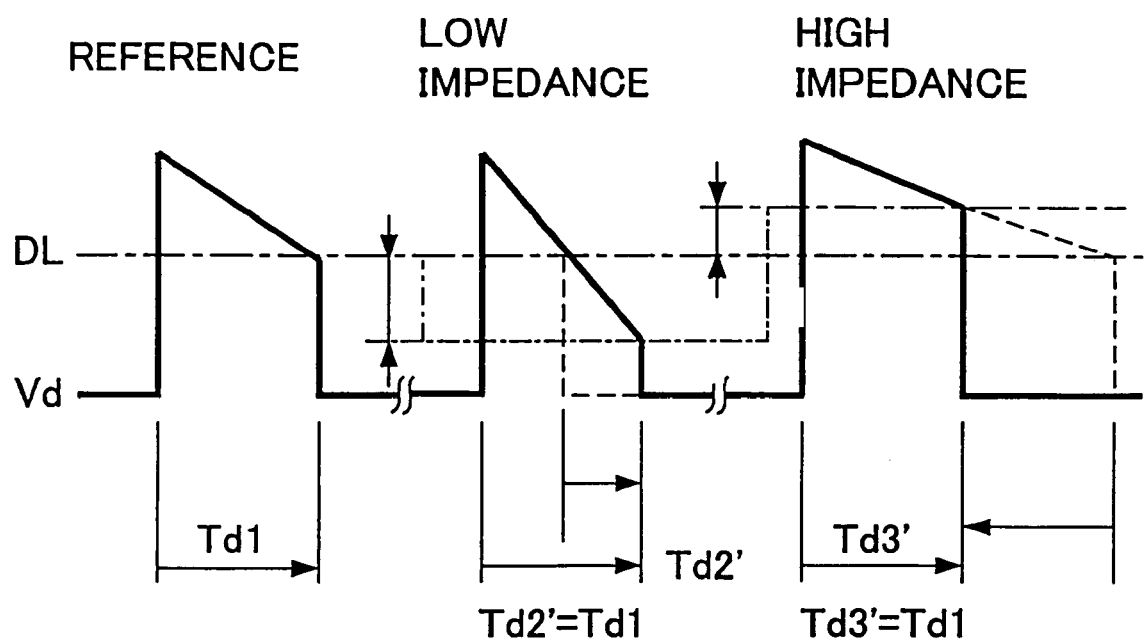
FIG. 10 shows exemplary operating waveforms during machining by the electric discharge machine shown in FIG. 8.
Figure 11:
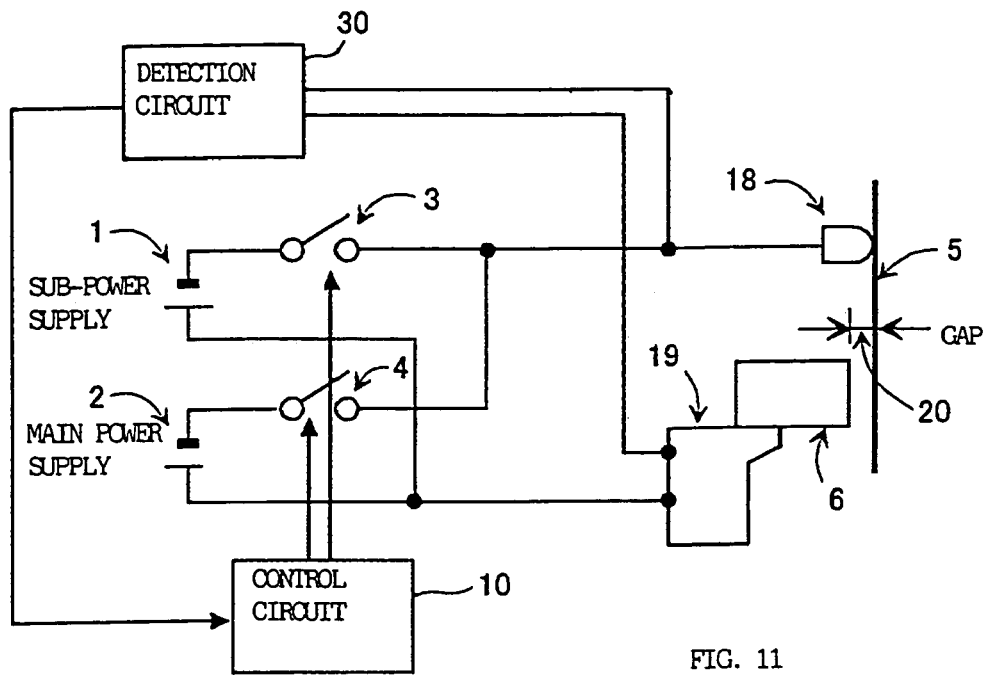
FIG. 11 shows an exemplary electric discharge machining circuit in a conventional electric discharge machine.
Figure 12:
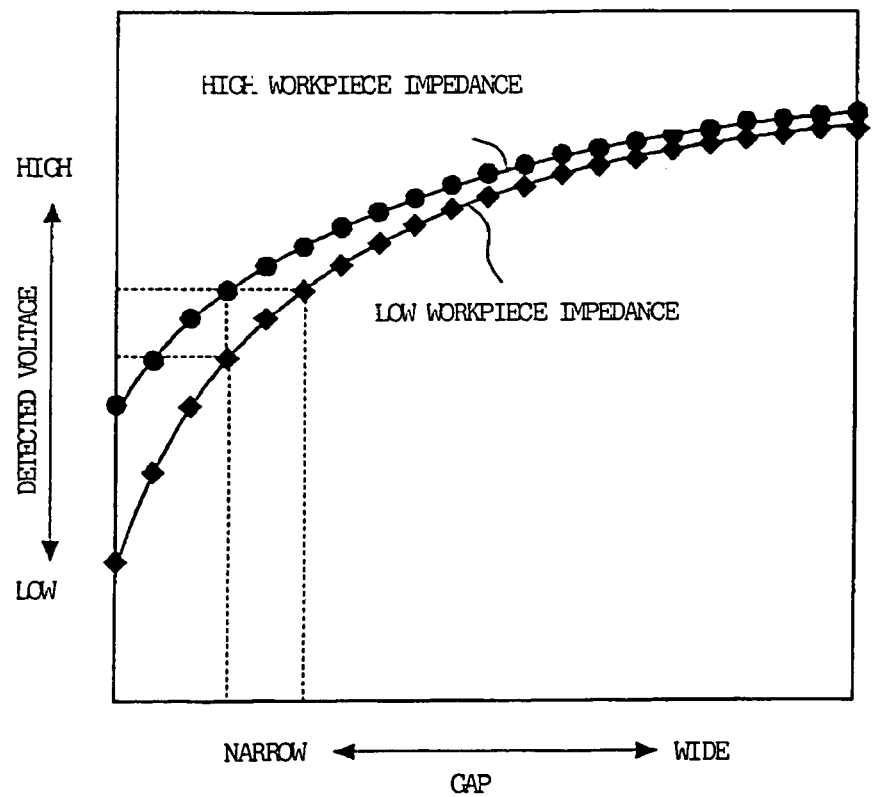
FIG. 12 plots detected gap voltage versus gap width.
Figure 13:
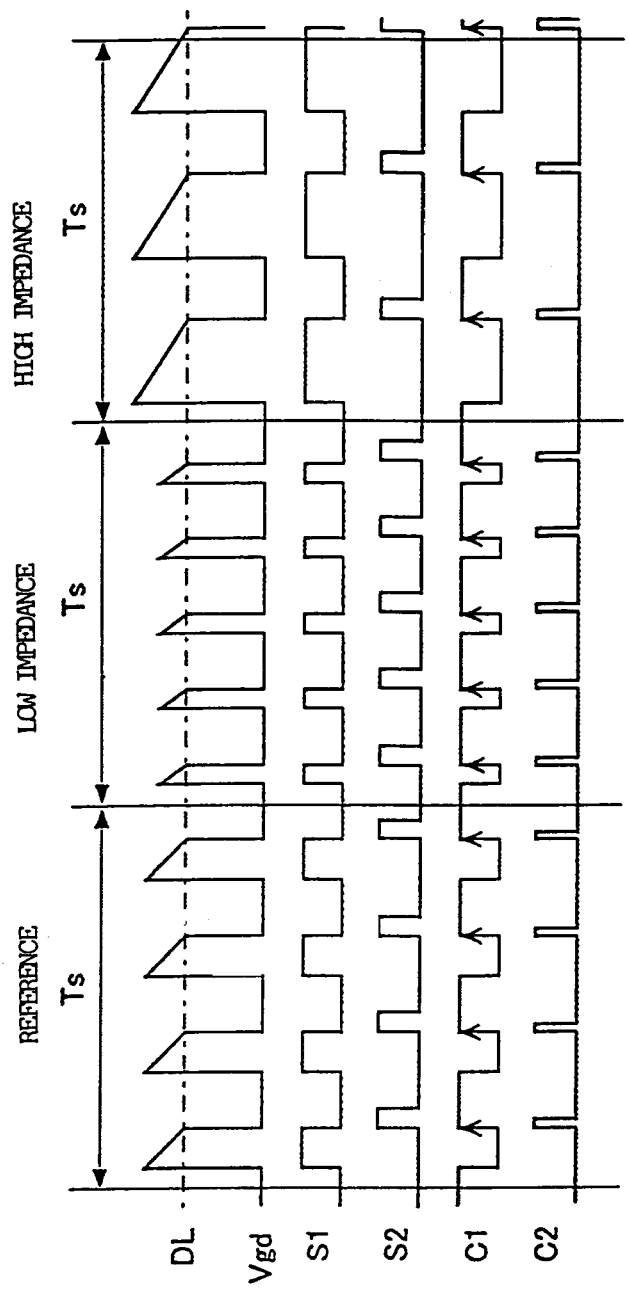
FIG. 13 shows exemplary operating waveforms during machining by a conventional electric discharge machine.
Figure 14:
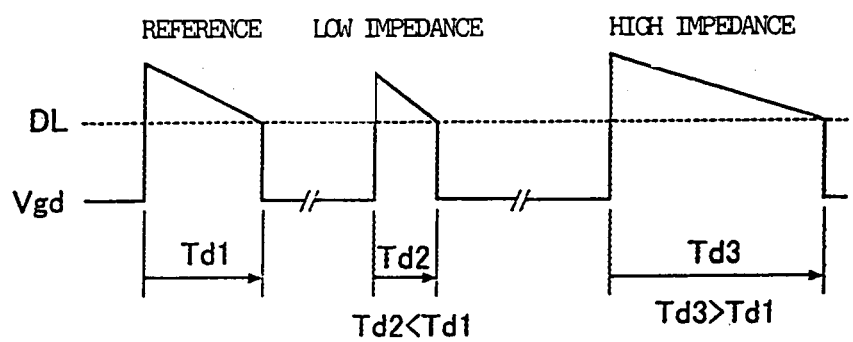
FIG. 14 shows further exemplary operating waveforms during machining by the conventional electric discharge machine.

The arithmetic circuit 17 calculates the detection level from equation (2) (step S34), outputs a digital signal DLD according to the calculated value, and sets the next detection level DLn (steps S35 and S36).

$$DLn=(DLn-1)-(DLn-1)*K*(TD-TDR)/TDR \quad (2)$$

where:

TD: Time from when a voltage is applied by the sub-power supply until power is supplied from the main power supply TDR: Reference time from when a voltage is applied by the sub-power supply until power is supplied from the main power supply K: Coefficient DLn, DLn-1: Detection levels FIG. 10 shows exemplary operating waveforms in the second embodiment.

According to equation (2), when the time TD from when a voltage is applied by the sub-power supply until power is supplied from the main power supply is shorter than the reference value TDR, control is performed to lower the detection level DL, thereby lengthening time TD until TD finally becomes equal to TDR.

When the time TD from when a voltage is applied by the sub-power supply until power is supplied from the main power supply is longer than the reference value TDR, on the other hand, control is performed to raise the detection level DL, thereby shortening time TD, until TD likewise becomes equal to TDR.

The time interval from when a voltage is applied by the sub-power supply until power is supplied from the main power supply is thereby held at the reference value, achieving stable machining.

The present invention is not limited to wire-cut electric discharge machines, but can also be applied to die-sinking electric discharge machines.

The invention claimed is:

1. An electric discharge machine having a main power supply and a sub-power supply connected in parallel across a gap formed by an electrode and a workpiece, in which a voltage is applied first from the sub-power supply to the gap, and then machining energy is supplied to the gap from the main power supply when detected that a gap voltage has fallen to or below a certain detection level, wherein
the electric discharge machine changes said detection level during machining by the electric discharge machine according to a machining state.

2. An electric discharge machine having a main power supply and a sub-power supply connected in parallel across a gap formed by an electrode and a workpiece, in which a voltage is applied first from the sub-power supply to the gap, and then machining energy is supplied to the gap from the main power supply when detected that a gap voltage has fallen to or below a certain detection level;
wherein the electric discharge machine changes said detection level during machining by the electric discharge machine according to a machining state; and
wherein said machining state is a number of main power pulses per unit distance, and the detection level is changed so that the number approaches a certain reference value.

3. An electric discharge machine having a main power supply and a sub-power supply connected in parallel across a gap formed by an electrode and a work piece, in which a voltage is applied first from the sub-power supply to the gap, and then machining energy is supplied to the gap from the main power supply when detected that a gap voltage has fallen to or below a certain detection level, wherein
the electric discharge machine changes said detection level during machining by the electric discharge machine according to a machining state; and
wherein said machining state is a time interval from when the voltage is applied by the sub-power supply until power is supplied from the main power supply, and the detection level is changed so that the time interval approaches a certain reference value.

4. An electric discharge machine comprising:
a main power supply and a sub-power supply connected in parallel across a gap formed by an electrode and a workpiece;
detecting means for detecting a gap voltage across said gap and comparing the gap voltage with a detection level;
control means for controlling timings at which voltages are applied from said main power supply and said sub-power supply to said gap and switching the voltage application source from the sub-power supply to the main power supply when the detection result from said detecting means indicates that said gap voltage has fallen to or below the detection level;
machining state detecting means for detecting a machining state of the electric discharge machine during machining according to the detection result from said detecting means; and
detection level changing means for changing the detection level used by said detecting means, according to the machining state detected by said machining state detecting means.

5. An electric discharge machine comprising:
a main power supply and a sub-power supply connected in parallel across a gap formed by an electrode and a workpiece;
detecting means for detecting a gap voltage across said gap and comparing the gap voltage with a detection level;
control means for controlling timings at which voltages are applied from said main power supply and said sub-power supply to said gap and switching the voltage application source from the sub-power supply to the main power supply when the detection result from said detecting means indicates that said gap voltage has fallen to or below the detection level;
machining state detecting means for detecting a machining state of the electric discharge machine during machining according to the detection result from said detecting means; and detection level changing means for changing the detection level used by said detecting means, according to the machining state detected by said machining state detecting means;

wherein:

the machining state detecting means counts a number of main power pulses per unit distance according to the detection result from said detecting means; and the detection level changing means changes the detection level in such a way that a difference between the number of main power pulses and a certain reference number of main power pulses becomes zero.

6. An electric discharge machine comprising: a main power supply and a sub-power supply connected in parallel across a gap formed by an electrode and a work piece;

detecting means for detecting a gap voltage across said gap and comparing the gap voltage with a detection level;

control means for controlling timings at which voltages are applied from said main power supply and said sub-power supply to said gap and switching the voltage application source from the sub-power supply to the main power supply when the detection result from said detecting means indicates that said gap voltage has fallen to or below the detection level;

machining state detecting means for detecting a machining state of the electric discharge machine during machining according to the detection result from said detecting means; and detection level changing means for changing the detection level used by said detecting means, according to the machining state detected by said machining state detecting means;

the machining state detecting means measures a time elapsed after a voltage is applied by the sub-power supply until power is supplied from the main power supply, according to the detection result from said detecting means; and the detection level changing means changes the detection level in such a way that a difference between the elapsed time and a certain reference lapse of time becomes zero.

* * * * *

UNITED STATES PATENT AND TRADEMARK OFFICE
CERTIFICATE OF CORRECTION

PATENT NO. : 7,145,096 B2 Page 1 of 1
APPLICATION NO. : 10/999949
DATED : December 5, 2006
INVENTOR(S) : Akihiro Sakurai et al.

It is certified that error appears in the above-identified patent and that said Letters Patent is hereby corrected as shown below:

Col. 2, line 15, change "the-gap" to --the gap--

Col. 7, lines 6-7, change "higher-impedance" to --higher impedance--

Col. 7, line 24, after "detected" delete "y"

Col. 7, line 50, change "the-gap" to --the gap--

Col. 7, line 50, after "for the" change "n" to --high-impedance--

Col. 9, line 59, change "from-the" to --from the--

Col. 11, line 36, change "until-TD" to --until TD--

Signed and Sealed this

Twenty-fourth Day of July, 2007

JON W. DUDAS
*Director of the United States Patent and Trademark Office*